(12) United States Patent
Amron

(10) Patent No.: US 7,613,294 B2
(45) Date of Patent: Nov. 3, 2009

(54) HANDS FREE AURAL DEVICE HOLDER

(75) Inventor: Alan Amron, Brooklyn, NY (US)

(73) Assignee: Thought Development, Inc., Woodbury, NY (US)

( * ) Notice: Subject to any disclaimer, the term of this patent is extended or adjusted under 35 U.S.C. 154(b) by 398 days.

(21) Appl. No.: 11/731,492

(22) Filed: Mar. 30, 2007

(65) Prior Publication Data

US 2008/0242366 A1     Oct. 2, 2008

(51) Int. Cl.
*H04M 1/00*     (2006.01)
*H04M 9/00*     (2006.01)
(52) U.S. Cl. ............... 379/449; 379/455; 455/575.6
(58) Field of Classification Search ........... 379/430, 379/446, 447, 449, 454, 455; 455/569.1, 455/90.3, 575.1, 575.6
See application file for complete search history.

(56) References Cited

U.S. PATENT DOCUMENTS

| 3,112,493 | A | | 12/1963 | Greenberg |
| 5,706,345 | A | * | 1/1998 | Allen ..................... 379/430 |
| 5,828,749 | A | * | 10/1998 | Brodskiy .................. 379/430 |
| 6,363,147 | B1 | * | 3/2002 | Maxwell ................... 379/430 |
| 6,374,090 | B1 | | 4/2002 | Morales |
| 7,120,247 | B1 | | 10/2006 | Wade |

* cited by examiner

*Primary Examiner*—Tuan D Nguyen
(74) *Attorney, Agent, or Firm*—Cohen Pontani Lieberman & Pavane LLP

(57) ABSTRACT

A hands-free aural device holder for hands-free use of an aural device that is designed to be held up to a user's ear is connectable to the device and defines at least a portion of a pocket for receiving the top of a user's ear when the holder is connected to the device. The pocket thus formed is configured to cover a top of the user's ear when the user's ear is received in the pocket such that the holder and the aural device connected to the holder are supported and retained on the user's ear, thereby allowing hands-free use of the aural device connectable to the holder.

20 Claims, 8 Drawing Sheets

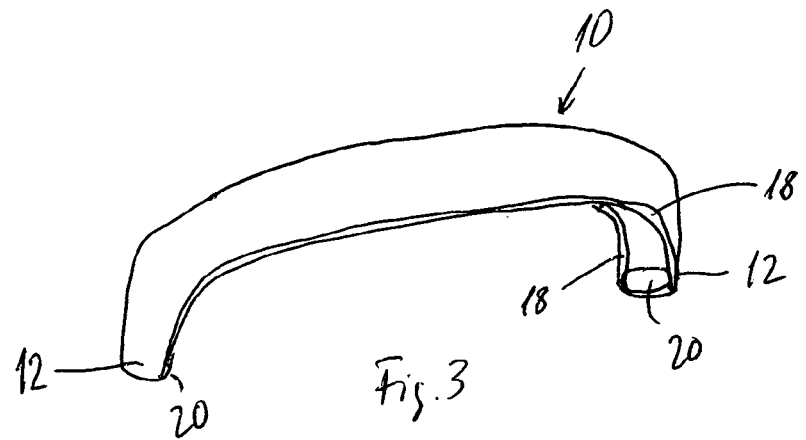
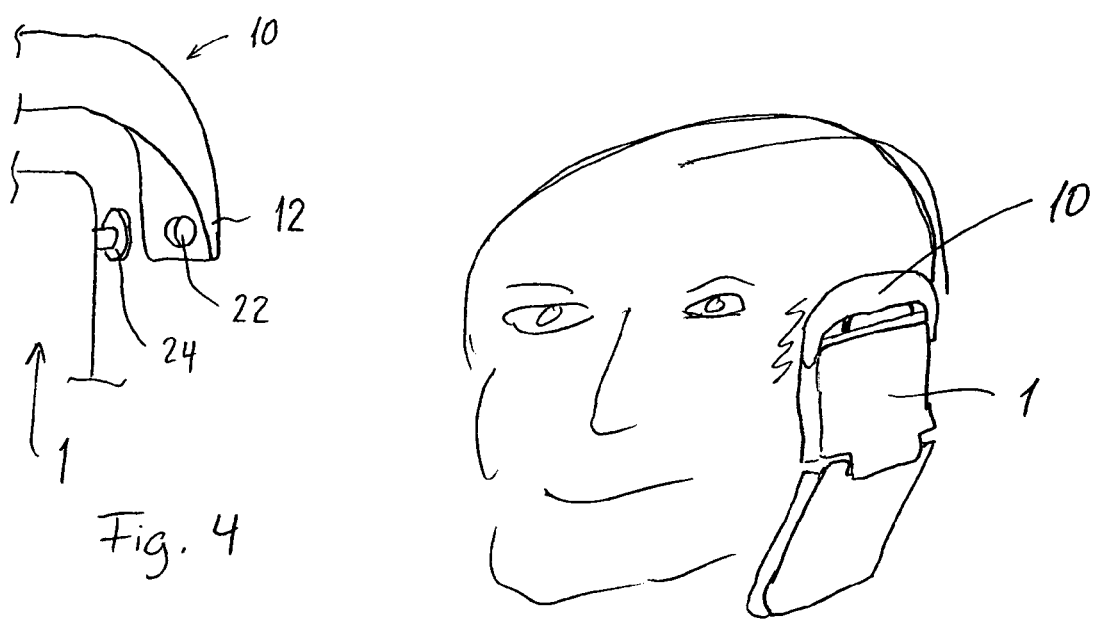
Fig. 3
Fig. 4
Fig. 5

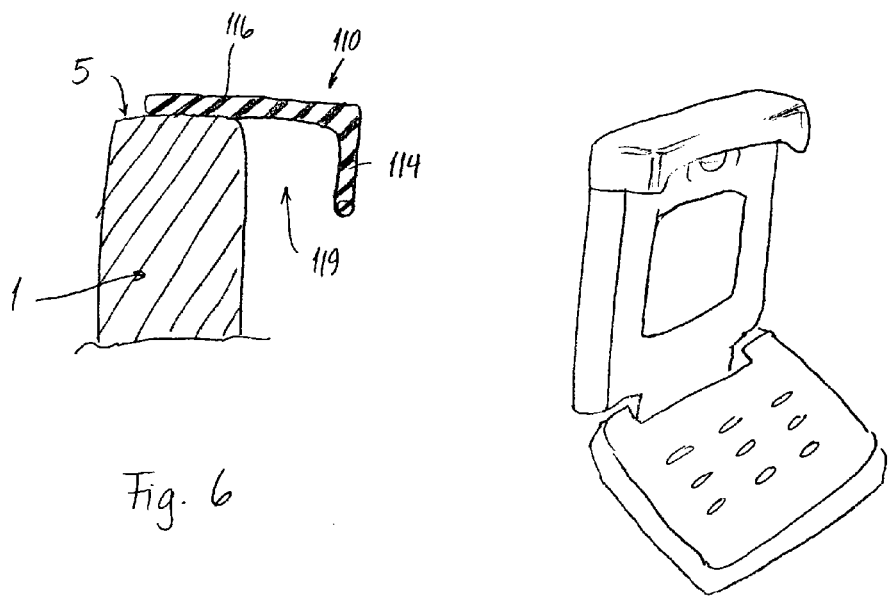
Fig. 6
Fig. 7
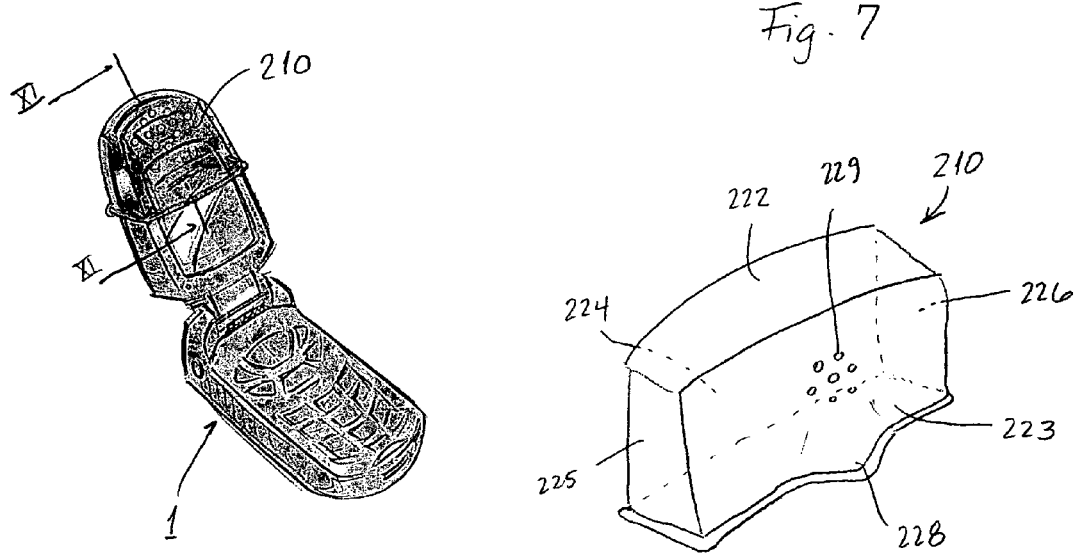
Fig. 8
Fig. 9

HANDS FREE AURAL DEVICE HOLDER

BACKGROUND OF THE INVENTION

1. Field of the Invention

The present invention relates to a holder for hands-free holding any device, and particularly a cell phone handset, to a user's ear.

2. Description of the Related Art

Cell phones are typically held by a user's hand and are therefore difficult to use when a user is also carrying packages, opening a door, or writing notes during the phone call. To overcome these obstacles and allow hands-free conversations, Bluetooth headsets are available. The Bluetooth headsets are worn on a user's ear and communicate with the user's cell phone using wireless Bluetooth communications. However, this solution requires an additional piece of equipment which the user must carry in order to conduct hands-free conversations.

Other known solutions for allowing hand-free conversations with cell phones include cell phone holders which hold the cell phones themselves on the user's head. An example of known cell phone holder is described in U.S. Pat. No. 7,120,247. This holder includes a headband with an attachment for holding a cell phone. However, this solution requires that the user always wear the headband or always carry the headband if the user wants to be able to conduct a hands-free conversation when required.

Another hands-free cell phone holder device is disclosed in U.S. Pat. No. 6,374,090. This device is an attachment to a cell phone which includes a clamp which grips the sides of the cell phone and a hook which is received around the back of a user's ear. This solution also requires an additional device that must be carried in addition to the phone. Furthermore, even if this device is kept in the attached state on the cell phone, it is adds bulk to the cell phone which makes it more difficult to hold the cell phone on the person when not in use.

SUMMARY OF THE INVENTION

An object of the present invention is to provide an aural device holder for hands-free holding of any device to a user's ear which overcomes the problems associated with the prior art.

Another object of the present invention is provide a hands-free phone handset holder which overcomes the problems associated with the prior art.

The present invention provides a holder for an aural device, wherein the term aural device in the specification and claims of this application is defined as any device that is held up to or on a user's ear during use. Examples of such devices are phone handsets (including handsets of traditional phones, wireless home phones, PDAs and cell phones), headphones, earmuffs, and any other device which is held up to a user's ear.

According to one embodiment of the invention, a hands-free aural device holder for hands-free use of an aural device that is designed to be held up to a user's ear is connectable to the device and defines at least a portion of a pocket for receiving the top of a user's ear when the holder is connected to the device. The pocket thus formed is configured to cover a top of the user's ear when the user's ear is received in the pocket such that the holder and the aural device connected to the holder are supported and retained on the user's ear, thereby allowing hands-free use of the aural device connectable to the holder. A first section of the holder is connectable to the aural device and a second section of the holder forms the at least a portion of a pocket.

In one embodiment, the holder comprises a strap having two opposing ends connectable to opposing sides of the aural device, wherein a cross-sectional shape of the strap between the ends defines a channel forming the pocket. More specifically, the strap has a top section and two side sections defining the channel which is open in a downward direction. A reinforcing strand running lengthwise through each of the side sections provides strength and stability to the form of the strap.

According to a further embodiment, the holder comprises a top section connectable to the device and a front section, wherein the front section faces a side of the device when the holder is connected to the device so that the pocket is formed between the front section of the holder and the device when the holder is connected to the device.

According to yet another embodiment, the holder has a front section, rear section, side sections connecting the ends of the front and rear sections, a top section, and an open bottom, said holder being one of substantially rectilinearly shaped or bucket-shaped such that an end of the device is insertable through the open bottom. In this embodiment, the pocket is defined between the front section and the device when the end of the device is received through the open bottom. The holder in this embodiment is formed by a rubber material and is held onto the device by a friction fit when an end of the device is received in the open bottom. The holder may additionally or alternatively comprises adhesive arranged at one of the front, rear, side, and top sections for connecting the holder to the device.

According to a embodiment, a free edge of the front section, adjacent the open bottom forms a projection, projects away from the device when the holder is connected to the device to facilitate placement of the top of the user's ear into the pocket. That is, the projection provides a portion which can be caught by the top of the user's ear during placement on the user's ear.

The front section bears against the handset and is elastically stretchable to form the pocket. Alternatively, the holder is arranged and dimensioned so that the front section is spaced from the handset when the holder is connected to the handset to define the pocket.

In yet a further embodiment, at least a portion of the front section is thinner than the remainder of the holder to facilitate stretching of the holder around a user's ear.

According to yet another embodiment, the holder is semi-circularly-shaped and comprises a circumferential section and front and rear side sections on opposing lateral sides of the circumferential section, the rear side section being connectable to the handset.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

In the drawings, wherein like reference characters denote similar elements throughout the several views:

FIG. 3 is a perspective view of the aural device holder of FIG. 1;

FIG. 4 is detailed perspective view of a connection of the holder to the aural device;

FIG. 5 is a perspective view of the aural device holder of FIG. 1 being used;

FIG. 6 is a sectional view of an aural device holder according to another embodiment of the invention;

FIG. 7 is a perspective view of the aural device holder of FIG. 6 arranged on a cell phone;

FIG. 8 is a perspective view of an aural device holder according to another embodiment arranged on a cell phone;

FIG. 9 is a perspective view of the aural device holder of FIG. 8;

DETAILED DESCRIPTION OF THE PRESENTLY PREFERRED EMBODIMENTS

Figure 1:
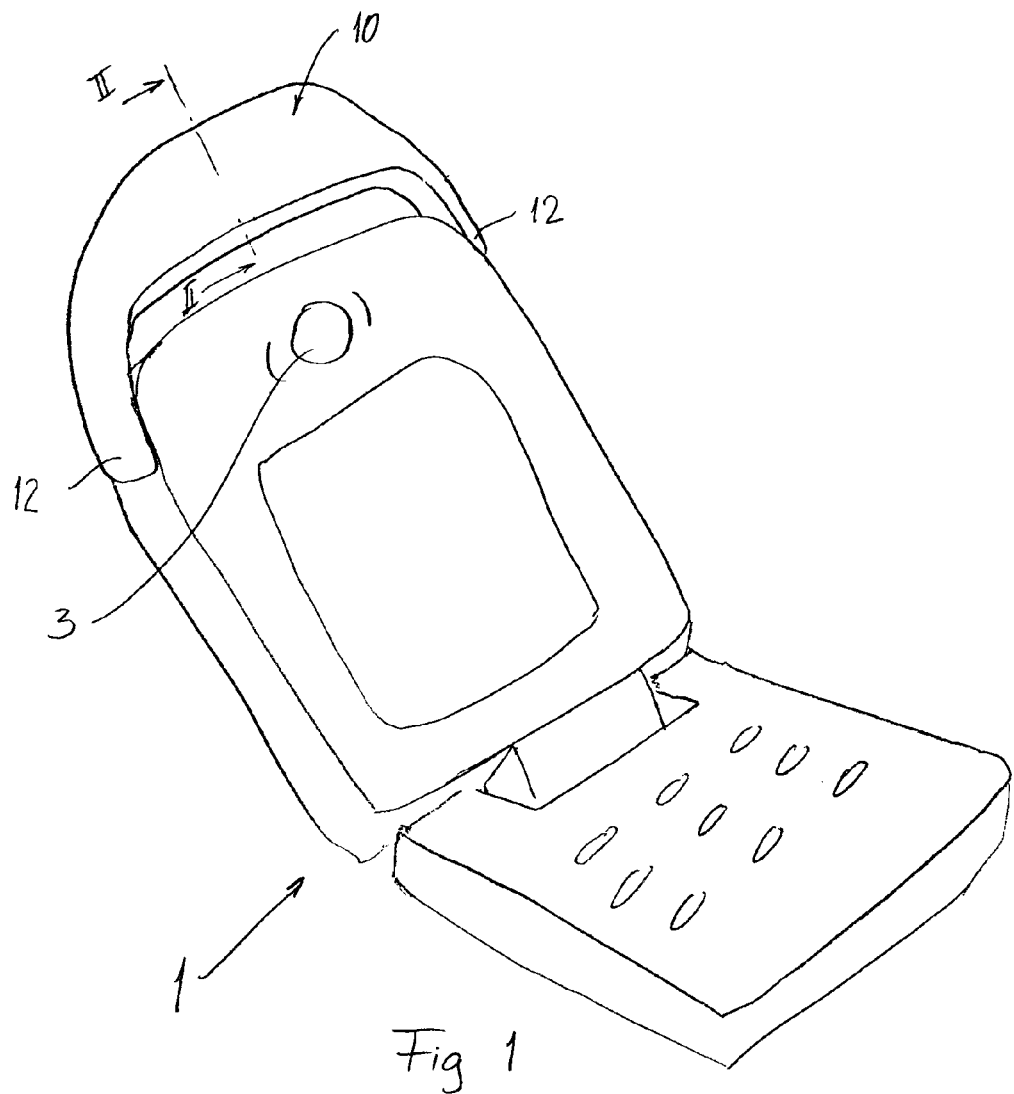
FIG. 1 is a perspective view of a hands-free aural device holder arranged on an aural device according to an embodiment of the present invention.
Figure 2:
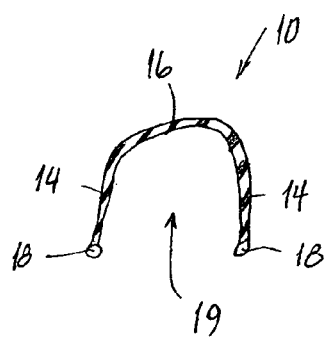
FIG. 2 is a sectional view of the aural device holder of FIG. 1.

A hands-free cell phone handset holder 10 for hanging a phone handset 1 on a user's ear is shown in FIGS. 1-3. Although the holder 10 is shown as arranged on a cell phone handset, the holder according to the present invention may be used for any device intended to be held up to a user's ear such as, for example, all types of phone handsets, ear phones, PDAs such as BLACKBERRY™ and PALM™ devices, and ear muffs. The holder 10 is attached to the device to be held to the user's ear and defines a pocket 19 for receiving a top end of a user's ear.

In the embodiment shown in FIGS. 1-3, holder 10 is arranged proximate a speaker or ear piece 3 on the handset 1, i.e., proximate a portion of the handset 1 that is normally held to the user's ear during use. The holder 10 is in the form of a strap having two opposing ends 12 that are connected on opposing sides of the handset 1. The holder 10 may be made from an elastic or inelastic cloth, or an elastic rubber material. An adhesive 20 is used to attach the ends 12 of the strap to the handset 1. However, any known or hereafter developed methods of attachment may be used. For example, FIG. 4 shows an embodiment in which an aperture 22 at the end of the strap engages a boss 24 on the cell phone 1.

Regardless of how the holder 10 is attached, the holder 10 of the embodiment of FIGS. 1-3 has a contour which forms a pocket 19 for receiving the top of the user's ear. For this purpose, the holder has side sections 14 and a top section 16 which define the pocket 19, the side sections 14 and top section 16 extending between the two ends 12 of the holder 10. For stability, the holder includes a reinforcing strand 18 arranged at the free edge of the side sections 14 and extending between the two ends 12. The reinforcing strand 18 may be formed by a thread or a string of fiber running through or stitched through the side sections 14. Alternatively, the reinforcing strand may simply comprise a thick portion of the material of the side sections, i.e., a bead of material. FIG. 5 shows the holder 10 in use holding a handset 1 onto a user's ear.

Instead of being formed as a strap, the holder 110 may be formed as an elastic piece having a top section 116 and a side section 114 as shown in FIGS. 6-7. In this embodiment, one part of the top section 116 is attached to a top 5 of the handset 1 using an adhesive. Another part of the top section 116 projects over the front of the handset 1. The side section projects downward from the top so that a space or pocket 119 is defined between the side 114 and the handset 1. Since the material is elastic, the side 114 deforms when the handset is closed. Accordingly, if the handset is a flip phone, it is allowed to completely close.

In another embodiment shown in FIGS. 8-9, a holder 210 comprises a top section 222, a front section 223, a rear section 224, two side sections 225, 226, and an open bottom. The holder 210 is preferably made from an elastic rubber material. The holder 210 is stretched over the top of the handset 1 and creates a friction fit with the handset 1. Alternatively, or additionally, an adhesive may be used to hold the hands-free holder 210 onto the handset 1. In the embodiment shown in FIGS. 8 and 9, the front section 223 of the holder 210 is loosely held against the handset 1. This configuration allows the handset 1 to close properly if it is a flip phone. It also allows the handset 1 to be used normally, i.e., without having the holder placed on the user's ear, with minimum interference. Holes 229 are provided on the front section 223 so that sound from the speaker is not muffled by the front section 223. At least a portion of the front section 223 of holder 210 may comprise a thinner material than the remainder of the holder to facilitate stretching over a user's ear.

Holder 210 in FIGS. 8-9 is depicted as being substantially rectilinear in that there are corners between each of the front 223, sides 225, 226, rear 224, and top 222. However, the holder may also be formed in an oblong oval shape so that the front 223, sides 225, 226, rear 224, and top 222 are defined as general locations without corners therebetween.

Figure 10:
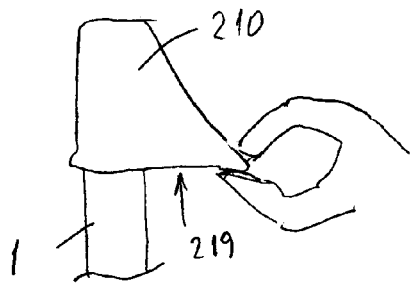
FIG. 10 is a side view of the aural device holder of FIG. 8 being stretched by a user.

The phone handset holder 210 includes a projection 228 on the front 223 as shown in FIG. 9 which facilitates manually pulling the projection 228 away from the phone to create a pocket 219 for receiving the top of a user's ear (see FIG. 10). Alternatively, the projection 228 creates a space which is placed over the user's ear and further movement of the cell phone and holder onto the ear forces the front 223 of the holder 210 to expand around the user's ear, making it easier to place the top of the user's ear into the pocket 219.

Figure 11:
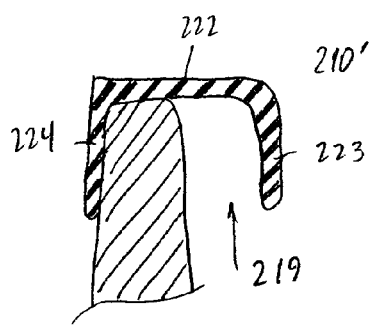
FIG. 11 is a sectional view of the aural device holder of FIG. 8.
Figure 13:
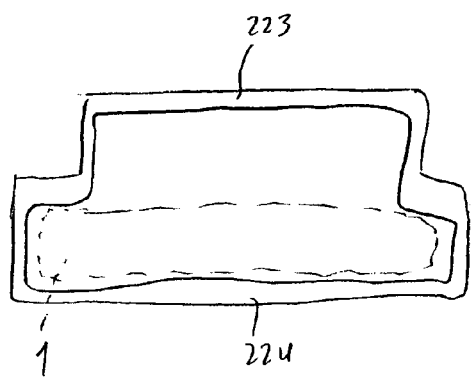
FIG. 13 is a bottom view of an embodiment of an aural device holder according to FIG. 8.
Figure 12:
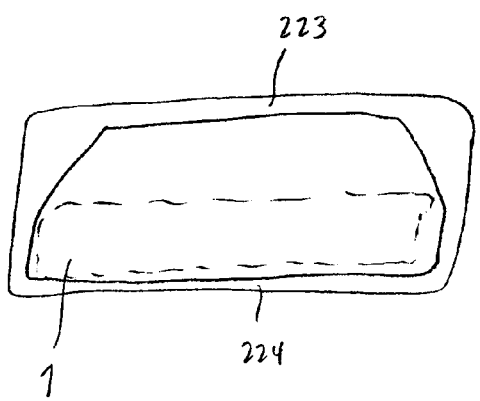
FIG. 12 is a bottom view of an embodiment of an aural device holder according to FIG. 8.
Figure 14:
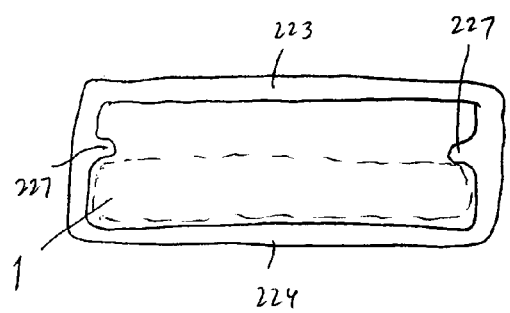
FIG. 14 is a bottom view of another embodiment of an aural device according to FIG. 8.

In the embodiment shown in FIG. 11, a holder 210' which is similar to the holder 210 described above, defines a pocket 219 for receiving the top of the user's ear between the front 223 of a holder 210 and the cell phone 1 when installed. The interior of the sides 225, 226 is configured to ensure that the rear 224 is held against the back of the cell phone so that the pocket is formed at the front 223 of the holder 210'. To accomplish this, the sides 225, 226 may be tapered or inclined as shown in FIG. 12 or stepped as shown in FIG. 12. In both the embodiments of FIGS. 12 and 13, the top of the cell phone 1 is inserted into the widest portion of the hands-free holder 210 so that the pocket 219 is created at the desired side of the cell phone 1. According to yet another embodiment shown in FIG. 14, the holder 210' has ribs 227 running up the sides 225, 226. The ribs 227 are located off-center such that they are located closer to the front 223. In this case, the cell phone may be inserted between the rear and the ribs 227 or between the front 223 and the ribs 227, depending on the thickness of the cell phone, to form the pocket 219 at the front 223 or the rear, respectively.

Figure 15:
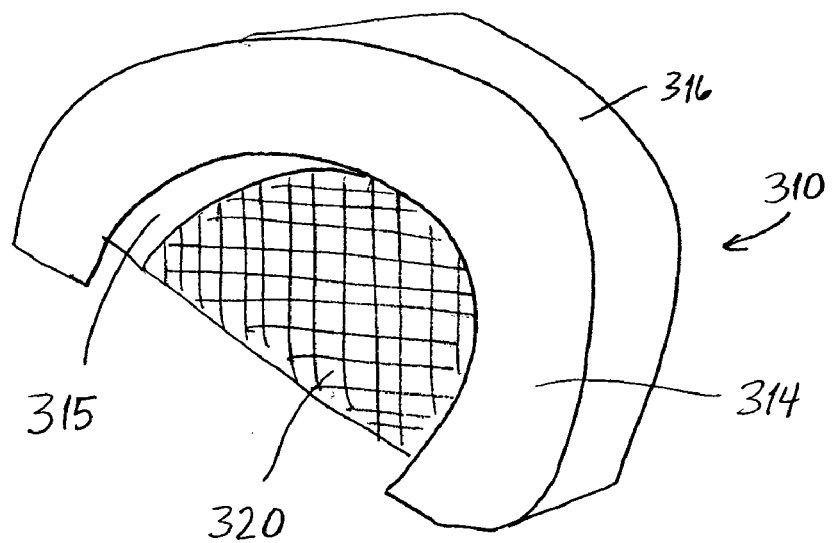
FIG. 15 is a perspective view of another embodiment of an aural device holder according to the present invention.
Figure 16:
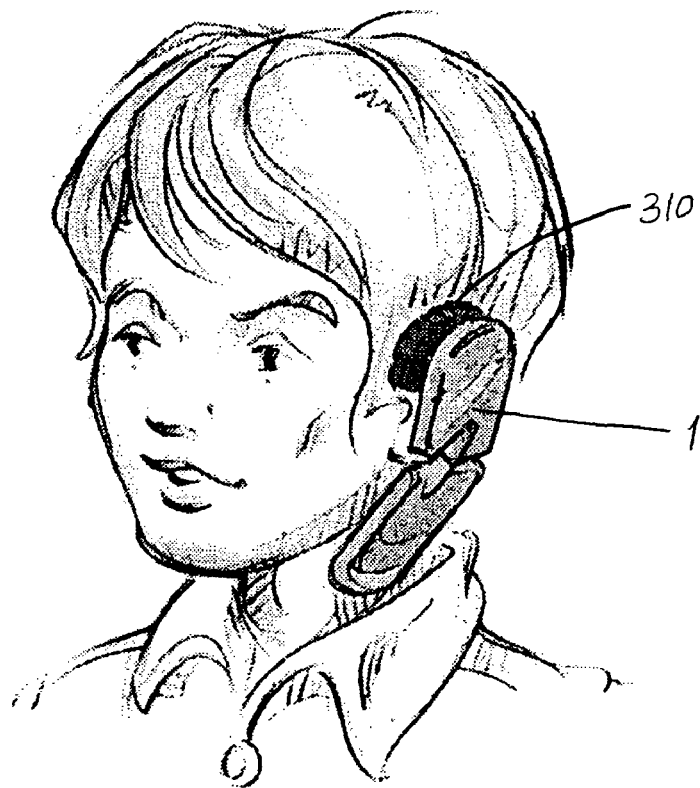
FIG. 16 is a perspective view of the embodiment of FIG. 15 in use.

In yet a further embodiment shown in FIGS. 15-16, a holder 310 approximates a semicircular shape having a circumferential outer wall 316 and two sidewalls 314, 315. The rear sidewall 315 is attached to the phone using an adhesive. Furthermore, a mesh or other material 320 which does not interfere with the sound projecting from the speaker is attached to the rear side wall 315. FIG. 16 shows the holder 310 being used to hold a phone on a user's ear.

Figure 17:
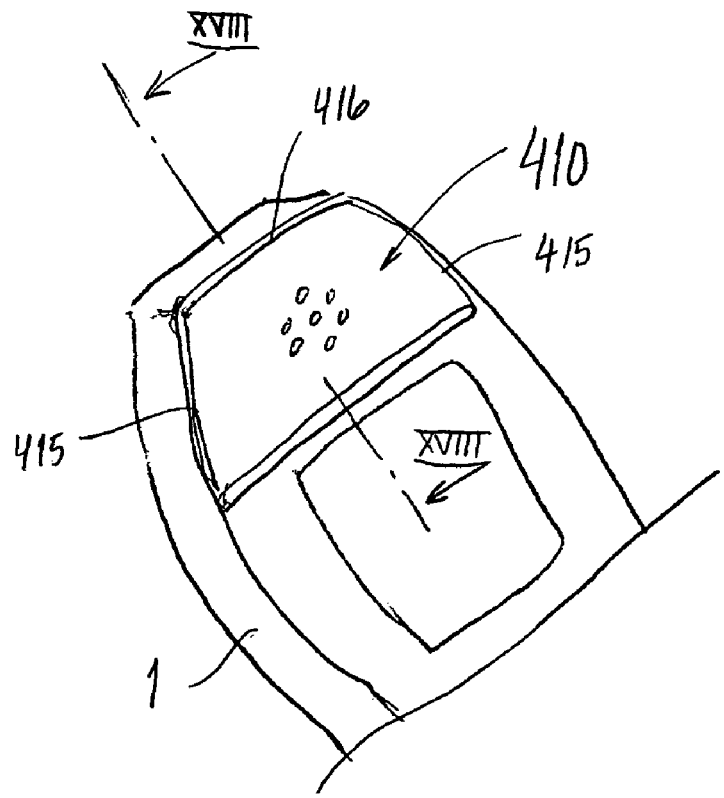
FIG. 17 is a perspective view of another embodiment of an aural device holder according to the present invention.
Figure 18:
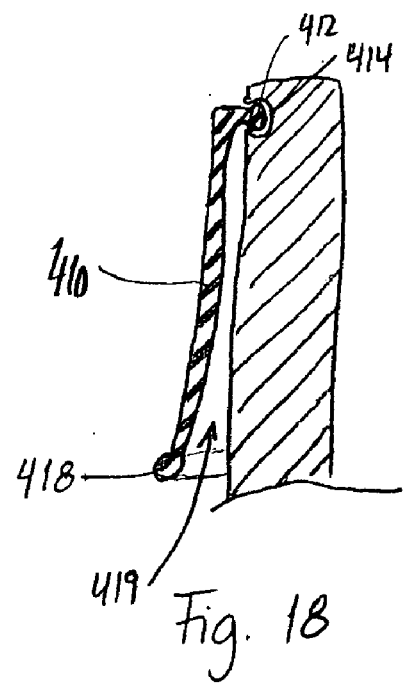
FIG. 18 is a sectional view of the aural device holder of FIG. 17.

In each of the above embodiments, the holder, 10, 110, 210, and 310 is retrofitted to a handset. However, the holder may also be incorporated into the OEM design of the device. FIGS. 17-18 show an example of a holder 410 being incorporated into an OEM design of a phone handset. According to this embodiment, the holder is an elastic material having a top edge 416 and side edges 415 that are held onto the face of the handset 1. The edges 415 and 416 may have a bead 412 running along and edge thereof which is inserted into a channel 414 in the face of the handset 1 to releasably connect the holder to the handset. The releasable connection allows the holder 410 to be removed for cleaning and/or replacement. Alternatively, the holder 410 may be permanently connected using an adhesive at the edges 415, 416. The lower edge of the holder 410 is not connected to the face of the handset 1 and includes a bead 418 for strength and stability. As shown in FIG. 18, a pocket 419 is defined between the holder 410 and the handset. Instead of holder 410, any of the embodiments of holder 10, 110, 210, and 310 described above may be incorporated into a handset or other device as an OEM design.

Figure 19:
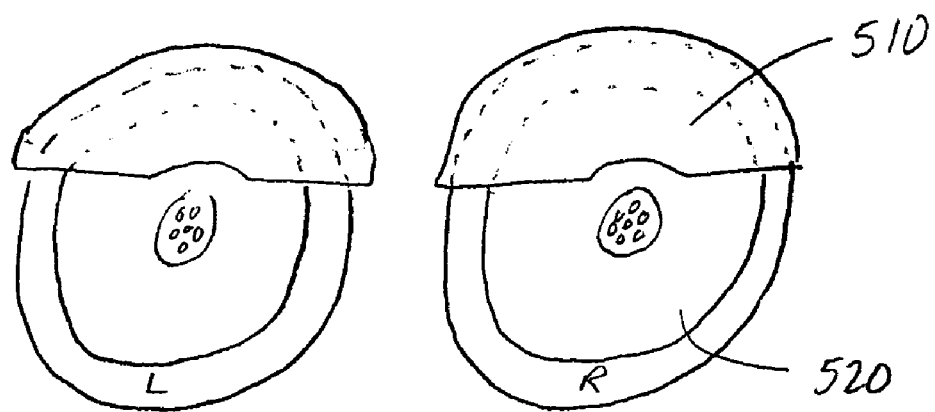
FIG. 19 is a schematic view of an aural device holder arranged on headphone speakers.
Figure 20:
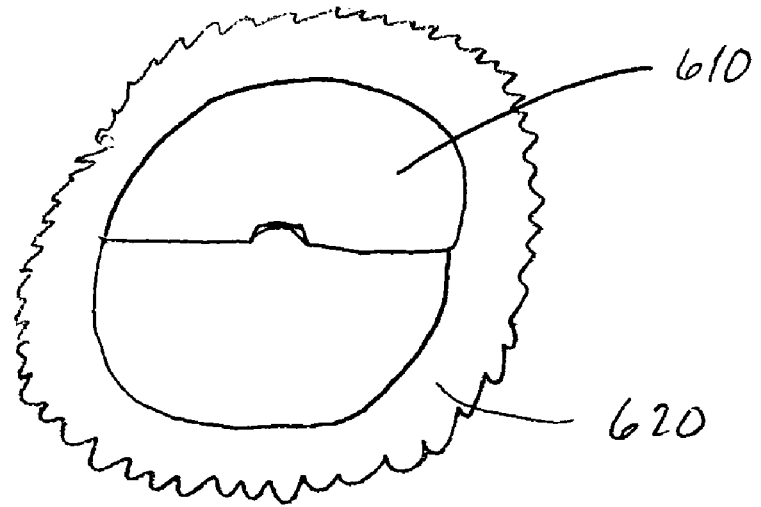
FIG. 20 is a schematic view of an embodiment of an aural device holder arranged on ear muffs.

As mentioned above, the holder 10, 110, 210, 310, and 410 described above may be used with various different devices which are held to a user's ear during use. FIG. 19 shows a holder 510 which is similar to the holder 410 arranged on ear phones, or headphones 520. The holder 520 eliminates the need for a support between the two speakers which arches over a user's head. FIG. 20 shows a further use in which holder 610, also similar to holder 410, is arranged on each side of ear muffs 620. Although the holders 510 and 610 are described and shown as being similar to holder 410, the holders 510, and 610 may also be designed similar to any others of the above-described embodiments of holders 10, 110, 210, and 310.

Figure 21:
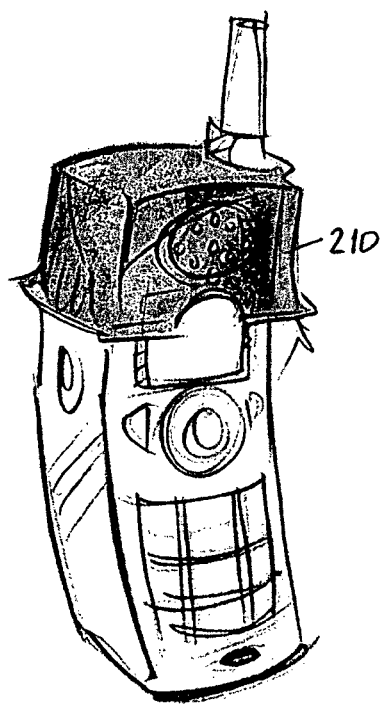
FIGS. 21-23 are schematic views of the device holder of FIG. 8 arranged on a wireless home phone, PDA, and traditional phone handset, respectively.
Figure 22:
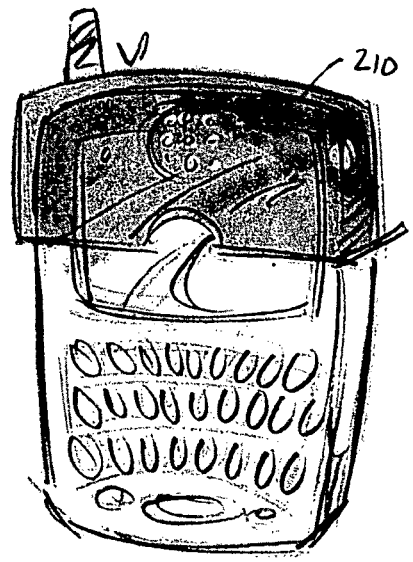
Figure 23:
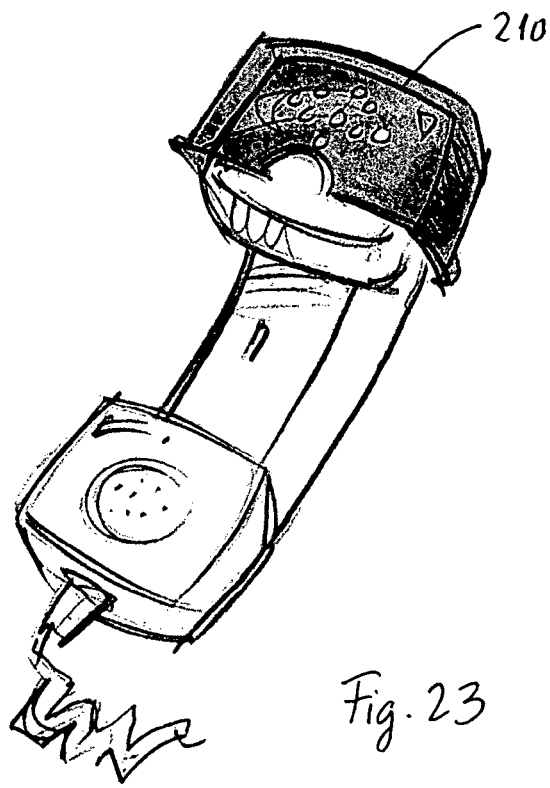

FIGS. 21-23 are schematic views of the device holder 210 of FIG. 8 arranged on a wireless home phone, PDA, and traditional phone handset, respectively.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. Moreover, it should be recognized that structures and/or elements shown and/or described in connection with any disclosed form or embodiment of the invention may be incorporated in any other disclosed or described or suggested form or embodiment as a general matter of design choice. It is the intention, therefore, to be limited only as indicated by the scope of the claims appended hereto.

What is claimed is:

1. A hands-free holder for hands-free use of a device that is designed to be held up to a user's ear, the holder being connectable to the device and defining at least a portion of a pocket for receiving the top of a user's ear when the holder is connected to the device, the pocket being configured to cover a top of the user's ear when the user's ear is received in the pocket such that the holder and the device is supported and retained on the user's ear when the holder is connected to the device, thereby allowing hands-free use of the device connectable to the holder, wherein said holder is hood-shaped and has a front section, rear section, side sections connecting the ends of the front and rear sections, a top section, and an open bottom, said holder being stretchably installable over an end of the device, the pocket being defined between the front section and the device when the holder is installed on the device.

2. The hands-free holder of claim 1, wherein said holder is formed by a rubber material and is held onto the device by a friction fit when an end of the device is received in the open bottom.

3. The hands-free holder of claim 2, wherein the holder further comprises adhesive arranged at one of the front, rear, side, and top sections for connecting the holder to the device.

4. The hands-free holder of claim 1, wherein the holder further comprises adhesive arranged at one of the front, rear, side, and top sections for connecting the holder to the device.

5. The hands-free holder of claim 1, wherein a free edge of the front section, adjacent the open bottom forms a projection projecting away from the device when the holder is connected to the device to facilitate placement of the top of the user's ear into the pocket.

6. The hands-free holder of claim 1, wherein the front section bears against the handset and is elastically stretchable to form the pocket.

7. The hands-free holder of claim 1, wherein the holder is arranged and dimensioned so that the front section is spaced from the handset when the holder is connected to the handset to define the pocket.

8. The hands-free holder of claim 1, wherein at least a portion of the front section is thinner than the remainder of the holder.

9. The hands-free holder of claim 1, wherein the holder is semi-circularly-shaped and comprises a circumferential section and front and rear side sections on opposing lateral sides of the circumferential section, the rear side section being connectable to the handset.

10. The hands-free holder of claim 1, wherein the holder is configured to receive a top end of one of a handset for a telephone, cell phone, or PDA.

11. The hands-free holder of claim 1, wherein the holder is configured to receive a top end of an ear phone.

12. The hands-free holder of claim 1, wherein the holder is configured to receive a top end of an ear muff.

13. The hands-free holder of claim 1, wherein the holder is one of rectilinearly shaped, cup-shaped, or bucket-shaped configured to receive a top end of an ear muff.

14. A handset device designed to be held proximate a user's ear during use thereof having a device body and a holder arranged on the device body, the holder defining at least a portion of a pocket for receiving the top of a user's ear, the pocket being configured to cover the top of the user's ear when the top of the user's ear is received in the pocket such that the device connected to the holder is supported by the top of the user's ear, thereby allowing hands-free use of the device, wherein said holder has a front section, rear section, side sections connecting the ends of the front and rear sections, a top section, and an open bottom, said holder being arranged over a top of the device, the pocket being defined between the front section and the device.

15. The handset device of claim 14, wherein a free edge of the front section, adjacent the open bottom forms a projection projecting away from the device when the holder is connected to the device to facilitate placement of the top of the user's ear into the pocket.

16. The handset device of claim 14, wherein a free edge of the front section, adjacent the open bottom forms a projection projecting away from the device when the holder is connected to the device to facilitate placement of the top of the user's ear into the pocket.

17. The handset device of claim 14, wherein the holder comprises a thin layer of material having opposing sides, a top edge, side edges, and a bottom edge, at least portions of the top edge and side edges being connected to the device, the pocket being defined between one of the opposing sides of the holder and the device.

18. The handset device of claim 17, wherein the holder is made of an elastically stretchable material such that the holder conforms to the contours of a user's ear when the top of the ear is inserted into the pocket.

19. The handset device of claim 14, wherein the holder is semi-circularly-shaped and comprises a circumferential section and front and rear side sections on opposing lateral sides of the circumferential section, the rear side section being connected to the device.

20. The handset device of claim 14, wherein the handset device is one of a telephone, cell phone, or PDA.

* * * * *